US010402113B2

(12) United States Patent
Ray et al.

(10) Patent No.: US 10,402,113 B2
(45) Date of Patent: Sep. 3, 2019

(54) LIVE MIGRATION OF DATA

(71) Applicant: HEWLETT PACKARD ENTERPRISE DEVELOPMENT LP, Houston, TX (US)

(72) Inventors: Harvey Ray, Frederick, CO (US); Derek Alan Sherlock, Boulder, CO (US); Gregg B. Lesartre, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/313,690

(22) PCT Filed: Jul. 31, 2014

(86) PCT No.: PCT/US2014/049193
§ 371 (c)(1),
(2) Date: Nov. 23, 2016

(87) PCT Pub. No.: WO2016/018383
PCT Pub. Date: Feb. 4, 2016

(65) Prior Publication Data
US 2017/0192714 A1    Jul. 6, 2017

(51) Int. Cl.
*G06F 3/06*     (2006.01)
*G06F 11/10*    (2006.01)

(52) U.S. Cl.
CPC ............ *G06F 3/0647* (2013.01); *G06F 3/065* (2013.01); *G06F 3/0619* (2013.01); *G06F 3/0656* (2013.01); *G06F 3/0683* (2013.01); *G06F 11/108* (2013.01)

(58) Field of Classification Search
CPC ..... G06F 3/0647; G06F 3/0619; G06F 3/0683
See application file for complete search history.

(56) References Cited

U.S. PATENT DOCUMENTS

| 5,032,744 A | 7/1991 | Liu |
| 5,243,592 A | 9/1993 | Perlman et al. |
| 5,327,553 A | 7/1994 | Jewett et al. |
| 5,533,999 A | 7/1996 | Hood et al. |

(Continued)

FOREIGN PATENT DOCUMENTS

| CN | 102521058 | 4/1999 |
| CN | 101576805 A | 11/2009 |

(Continued)

OTHER PUBLICATIONS

International Searching Authority, The International Search Report6 and the Written Opinion, dated Feb. 26, 2015, 10 Pages.

(Continued)

*Primary Examiner* — Edward J Dudek, Jr.
(74) *Attorney, Agent, or Firm* — Mannava & Kang, P.C.

(57) ABSTRACT

According to an example, hierarchal stripe locks may be obtained for a source stripe and a destination stripe. In response to receiving data for the source stripe, the data is written from the source stripe to the destination stripe, and the hierarchal stripe locks are released for the source stripe and the destination stripe. In response to receiving the data-migrated token, the hierarchal stripe locks are released for the source stripe and the destination stripe.

13 Claims, 8 Drawing Sheets

(56) References Cited

U.S. PATENT DOCUMENTS

| | | | |
|---|---|---|---|
| 5,546,535 A | 8/1996 | Stallmo et al. | |
| 5,555,266 A | 9/1996 | Buchholz et al. | |
| 5,633,996 A | 5/1997 | Hayashi et al. | |
| 5,633,999 A | 5/1997 | Clowes et al. | |
| 5,724,046 A | 3/1998 | Martin et al. | |
| 5,905,871 A | 5/1999 | Buskens et al. | |
| 6,073,218 A | 6/2000 | DeKoning et al. | |
| 6,081,907 A | 6/2000 | Witty et al. | |
| 6,092,191 A | 7/2000 | Shimbo et al. | |
| 6,141,324 A | 10/2000 | Abbott et al. | |
| 6,151,659 A | 11/2000 | Solomon et al. | |
| 6,181,704 B1 | 1/2001 | Drottar et al. | |
| 6,389,373 B1 | 5/2002 | Ohya | |
| 6,457,098 B1 | 9/2002 | DeKoning et al. | |
| 6,467,024 B1 | 10/2002 | Bish et al. | |
| 6,490,659 B1 | 12/2002 | McKean et al. | |
| 6,502,165 B1 | 12/2002 | Kishi et al. | |
| 6,510,500 B2 | 1/2003 | Sarkar et al. | |
| 6,542,960 B1 | 4/2003 | Wong et al. | |
| 6,654,830 B1 | 11/2003 | Taylor et al. | |
| 6,735,645 B1 | 5/2004 | Weber et al. | |
| 6,826,247 B1 | 11/2004 | Elliott et al. | |
| 6,834,326 B1 | 12/2004 | Wang et al. | |
| 6,911,864 B2 | 6/2005 | Bakker et al. | |
| 6,938,091 B2 | 8/2005 | Das Sharma | |
| 6,970,987 B1 | 11/2005 | Ji et al. | |
| 7,366,808 B2 | 4/2008 | Kano et al. | |
| 7,506,368 B1 | 3/2009 | Kersey et al. | |
| 7,738,540 B2 | 6/2010 | Yamasaki et al. | |
| 7,839,858 B2 | 11/2010 | Wiemann et al. | |
| 7,908,513 B2 | 3/2011 | Ogasawara et al. | |
| 7,934,055 B2 | 4/2011 | Flynn et al. | |
| 7,996,608 B1 | 8/2011 | Chatterjee et al. | |
| 8,005,051 B2 | 8/2011 | Watanabe | |
| 8,018,890 B2 | 9/2011 | Venkatachalam et al. | |
| 8,054,789 B2 | 11/2011 | Boariu et al. | |
| 8,103,869 B2 | 1/2012 | Balandin et al. | |
| 8,135,906 B2 | 3/2012 | Wright et al. | |
| 8,161,236 B1 | 4/2012 | Noveck et al. | |
| 8,169,908 B1 | 5/2012 | Sluiter et al. | |
| 8,171,227 B1 | 5/2012 | Goldschmidt et al. | |
| 8,332,704 B2 | 12/2012 | Chang et al. | |
| 8,341,459 B2 | 12/2012 | Kaushik et al. | |
| 8,386,834 B1 | 2/2013 | Goel et al. | |
| 8,386,838 B1 | 2/2013 | Byan et al. | |
| 8,462,690 B2 | 6/2013 | Chang et al. | |
| 8,483,116 B2 | 7/2013 | Chang et al. | |
| 8,605,643 B2 | 12/2013 | Chang et al. | |
| 8,619,606 B2 | 12/2013 | Nagaraja | |
| 8,621,147 B2 | 12/2013 | Galloway et al. | |
| 8,667,322 B1 | 3/2014 | Chatterjee et al. | |
| 8,700,570 B1* | 4/2014 | Marathe | G06F 17/30197 707/634 |
| 8,793,449 B1 | 7/2014 | Kimmel et al. | |
| 8,812,901 B2 | 8/2014 | Sheffield, Jr. | |
| 9,128,948 B1 | 9/2015 | Raorane | |
| 9,166,541 B2 | 10/2015 | Funato et al. | |
| 9,298,549 B2 | 3/2016 | Camp et al. | |
| 9,621,934 B2 | 4/2017 | Seastrom et al. | |
| 2001/0002480 A1 | 5/2001 | Dekoning et al. | |
| 2002/0162076 A1 | 10/2002 | Talagala et al. | |
| 2003/0037071 A1 | 2/2003 | Harris et al. | |
| 2003/0126315 A1 | 7/2003 | Tan et al. | |
| 2004/0133573 A1 | 7/2004 | Miloushev et al. | |
| 2004/0233078 A1 | 11/2004 | Takehara | |
| 2005/0027951 A1 | 2/2005 | Piccirillo et al. | |
| 2005/0044162 A1 | 2/2005 | Liang et al. | |
| 2005/0120267 A1 | 6/2005 | Burton et al. | |
| 2005/0144406 A1 | 6/2005 | Chong, Jr. | |
| 2005/0157697 A1 | 7/2005 | Lee et al. | |
| 2006/0112304 A1 | 5/2006 | Subramanian et al. | |
| 2006/0129559 A1 | 6/2006 | Sankaran et al. | |
| 2006/0264202 A1 | 11/2006 | Hagmeier et al. | |
| 2007/0028041 A1 | 2/2007 | Hallyal et al. | |
| 2007/0140692 A1 | 6/2007 | DeCusatis et al. | |
| 2007/0168693 A1 | 7/2007 | Pittman | |
| 2007/0174657 A1 | 7/2007 | Ahmadian et al. | |
| 2008/0060055 A1 | 3/2008 | Lau | |
| 2008/0137669 A1 | 6/2008 | Balandina et al. | |
| 2008/0201616 A1 | 8/2008 | Ashmore | |
| 2008/0281876 A1 | 11/2008 | Mimatsu | |
| 2009/0080432 A1 | 3/2009 | Kolakeri et al. | |
| 2009/0259882 A1 | 10/2009 | Shellhamer | |
| 2009/0313313 A1 | 12/2009 | Yokokawa et al. | |
| 2010/0107003 A1 | 4/2010 | Kawaguchi | |
| 2010/0114889 A1 | 5/2010 | Rabii et al. | |
| 2011/0109348 A1 | 5/2011 | Chen et al. | |
| 2011/0173350 A1 | 7/2011 | Coronado et al. | |
| 2011/0208994 A1 | 8/2011 | Chambliss et al. | |
| 2011/0213928 A1 | 9/2011 | Grube et al. | |
| 2011/0246819 A1 | 10/2011 | Callaway et al. | |
| 2011/0314218 A1 | 12/2011 | Bert | |
| 2012/0032718 A1 | 2/2012 | Chan et al. | |
| 2012/0059800 A1 | 3/2012 | Guo | |
| 2012/0096329 A1 | 4/2012 | Taranta, II | |
| 2012/0137098 A1* | 5/2012 | Wang | G06F 3/0617 711/165 |
| 2012/0166699 A1 | 6/2012 | Kumar et al. | |
| 2012/0166909 A1 | 6/2012 | Schmisseur et al. | |
| 2012/0201289 A1 | 8/2012 | Abdalla et al. | |
| 2012/0204032 A1 | 8/2012 | Wilkins et al. | |
| 2012/0213055 A1 | 8/2012 | Bajpai et al. | |
| 2012/0297272 A1 | 11/2012 | Bakke et al. | |
| 2012/0311255 A1 | 12/2012 | Chambliss | |
| 2013/0060948 A1 | 3/2013 | Ulrich et al. | |
| 2013/0128721 A1 | 5/2013 | DeCusatis et al. | |
| 2013/0128884 A1 | 5/2013 | DeCusatis et al. | |
| 2013/0138759 A1 | 5/2013 | Chen et al. | |
| 2013/0148702 A1 | 6/2013 | Payne | |
| 2013/0227216 A1 | 8/2013 | Cheng et al. | |
| 2013/0246597 A1 | 9/2013 | Iizawa et al. | |
| 2013/0297976 A1 | 11/2013 | McMillen | |
| 2013/0311822 A1 | 11/2013 | Kotzur et al. | |
| 2013/0312082 A1 | 11/2013 | Izu et al. | |
| 2014/0067984 A1 | 3/2014 | Danilak | |
| 2014/0095865 A1 | 4/2014 | Yerra et al. | |
| 2014/0115232 A1 | 4/2014 | Goss et al. | |
| 2014/0136799 A1 | 5/2014 | Fortin | |
| 2014/0269731 A1 | 9/2014 | Decusatis et al. | |
| 2014/0281688 A1 | 9/2014 | Tiwari et al. | |
| 2014/0304469 A1 | 10/2014 | Wu | |
| 2014/0331297 A1 | 11/2014 | Innes et al. | |
| 2015/0012699 A1 | 1/2015 | Rizzo et al. | |
| 2015/0095596 A1 | 4/2015 | Yang et al. | |
| 2015/0146614 A1 | 5/2015 | Yu et al. | |
| 2015/0199244 A1 | 7/2015 | Venkatachalam et al. | |
| 2015/0288752 A1 | 10/2015 | Voigt | |
| 2016/0034186 A1 | 2/2016 | Weiner et al. | |
| 2016/0170833 A1 | 6/2016 | Segura et al. | |
| 2016/0196182 A1 | 7/2016 | Camp et al. | |
| 2016/0226508 A1 | 8/2016 | Kurooka et al. | |
| 2017/0253269 A1 | 9/2017 | Kanekawa et al. | |
| 2017/0302409 A1 | 10/2017 | Sherlock | |
| 2017/0346742 A1 | 11/2017 | Shahar et al. | |

FOREIGN PATENT DOCUMENTS

| | | |
|---|---|---|
| CN | 104333358 A | 2/2015 |
| EP | 1347369 B1 | 11/2012 |
| IN | 1546/MUM/2013 | 3/2015 |
| TW | 201346530 A | 11/2013 |
| WO | WO-02091689 A1 | 11/2002 |
| WO | 20141120136 A1 | 8/2014 |

OTHER PUBLICATIONS

Mao, Y. et al., A New Parity-based Migration Method to Expand Raid-5, (Research Paper), Nov. 4, 2013, 11 Pages.

Almeida, P. S., et al; Scalable Eventually Consistent Counters Over Unreliable Networks; Jul. 12, 2013; 32 Pages.

Amiri, K. et al., Highly Concurrent Shared Storage, (Research Paper), Sep. 7, 1999, 25 Pages.

(56) References Cited

OTHER PUBLICATIONS

PCT; "International Search Report and Written Opinion"; cited in Appl. No. PCT/US2015/013898; dated Oct. 8, 2015; 11 pages.
PCT; "International Search Report and Written Opinion"; cited in Appl, No. PCT/US2014/053704; dated May 15, 2015; 13 pages.
Razavi, B. et al., "Design Techniques for High-Speed, High-Resolution Comparators," (Research Paper), IEEE Journal of Solid-State Circuits 27.12, Dec. 12, 1992, pp. 1916-1926, http://www.seas.ucla.edu/brweb/papers/Journals/R%26WDec92_2.pdf.
Xingyuan, T. et al., "An Offset Cancellation Technique in a Switched-Capacitor Comparator for SAR ADCs," (Research Paper), Journal of Semiconductors 33.1, Jan. 2012, 5 pages, http://www.jos.ac.cn/bdtxbcn/ch/reader/create_pdf.aspx?file_no=11072501.
Kimura et al., "A 28 Gb/s 560 mW Multi-Standard SerDes With Single-Stage Analog Front-End and 14-Tap Decision Feedback Equalizer in 28 nm CMOS," IEEE Journal of Solid-State Circuits, vol. 49, No. 12, December 2014, pp. 3091-3103.
Li, M. et al.: Toward I/O-Efficient Protection Against Silent Data Corruptions in RAID Arrays, (Research Paper); Jun. 2-6, 2014; 12 Pages.
Kang, Y. et al., "Fault-Tolerant Flow Control in On-Chip Networks," (Research Paper), Proceedings for IEEE, May 3-6, 2010, 8 pages, available at http://citeseerx.ist.psu.edu/viewdoc/download?doi=10.1.1.228.7865&rep=rep1&type=pdf.
International Search Report and Written Opinion received for PCT Patent Application No. PCT/US2015/023708, dated Apr. 22, 2016, 11 pages.
International Search Report and Written Opinion received for PCT Patent Application No. PCT/US2015/013921, dated Oct. 28, 2015, 10 pages.
International Search Report and Written Opinion received for PCT Patent Application No. PCT/US2014/062196, dated Jun. 30, 2015, 13 pages.
International Preliminary Report on Patentability received for PCT Patent Application No. PCT/US2015/023708, dated Oct. 12, 2017, 10 pages.
International Preliminary Report on Patentability received for PCT Patent Application No. PCT/US2015/013921, dated Aug. 10, 2017, 9 pages.
International Preliminary Report on Patentability received for PCT Patent Application No. PCT/US2014/062196, dated May 4, 2017, 12 pages.
EMC2; High Availability and Data Protection with EMC Isilon Scale-out NAS, (Research Paper); Nov. 2013; 36 Pages.
Do I need a second RAID controller for fault-tolerance ?, (Research Paper); Aug. 22, 2010; 2 Pages; http://serverfault.com/questions/303869/do-i-need-a-second-raid-controller-for-fault-tolerance.
International Search Report and Written Opinion received for PCT Patent Application No. PCT/US2015/013817, dated Oct. 29, 2015, 11 pages.
International Preliminary Report on Patentability received for PCT Patent Application No. PCT/US2015/013817, dated Aug. 10, 2017, 9 pages.
International Preliminary Report on Patentability received for PCT Patent Application No. PCT/US2014/053704, dated Mar. 16, 2017, 10 pages.
International Preliminary Report on Patentability received for PCT Patent Application No. PCT/US2014/049193, dated Feb. 9, 2017, 7 pages.

\* cited by examiner

LIVE MIGRATION OF DATA

BACKGROUND

Current data storage devices such as volatile and nonvolatile memory often include a fault tolerance to ensure that data is not lost in the event of a device error or failure. An example of a fault tolerance provided to current data storage devices involves storing data with redundancy. Examples of redundant data storage methods include duplicating data and storing the data in multiple locations and adding parity bits to store calculated error recovery bits. A consistency between the data and its redundancy should be maintained during a migration to another memory location to prevent data corruption and preserve fault tolerance.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
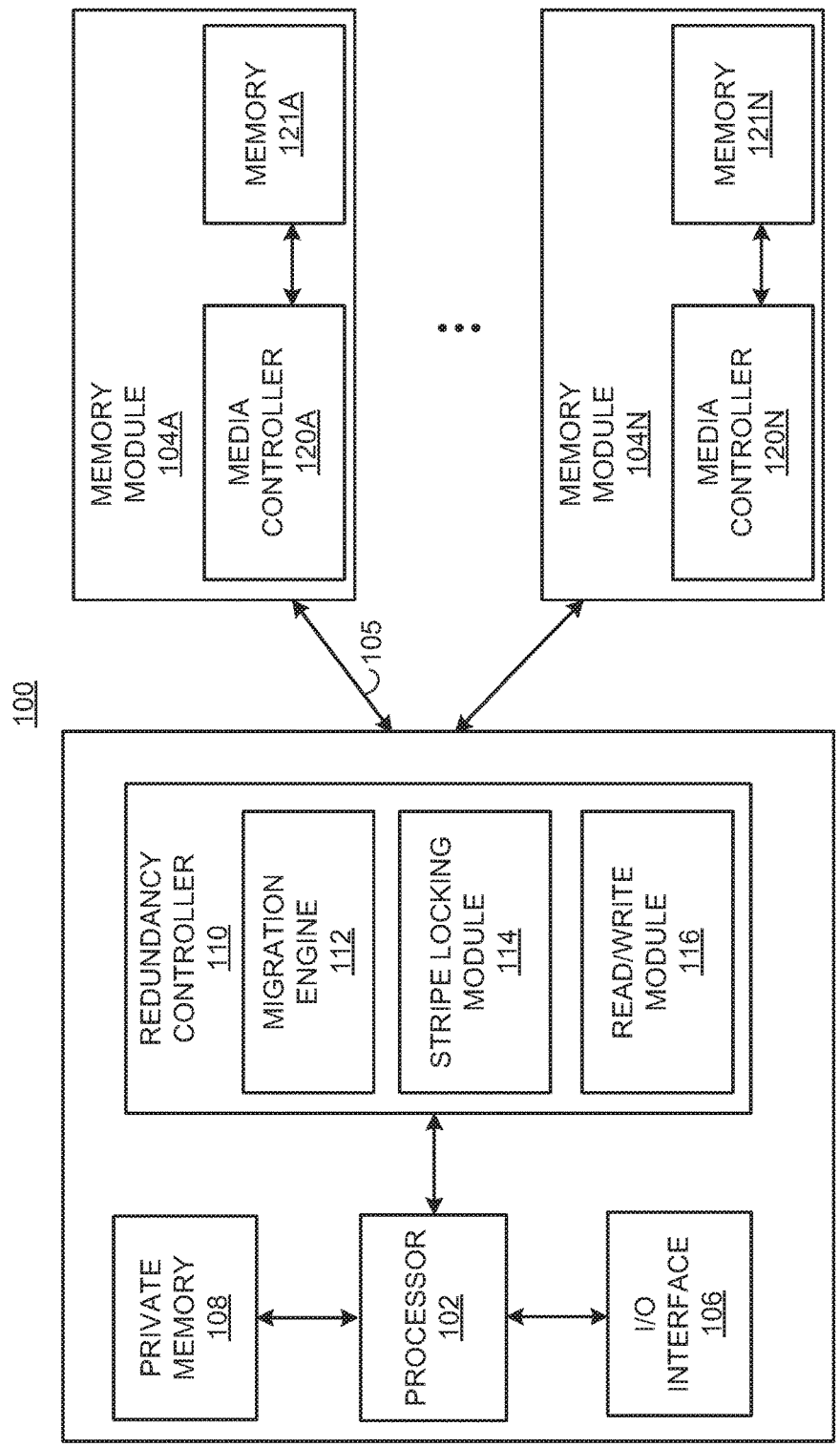
FIG. 1 shows a simplified block diagram of a computing device for a live migration of data, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples of a method for live migration of data from a source stripe to a destination stripe. Live migration refers to the process of moving data from one memory module to another memory module without impacting the availability of the memory modules. A stripe may include a combination of data blocks from at least one data memory module and at least one parity memory module. The disclosed method, for instance, enables live migration of memory without intervention by an operating system. The memory may be concurrently accessed by one or more processors (e.g., servers) while parity-data consistency is maintained for each stripe affected by the migration. Also disclosed herein are a computing device and hardware system for implementing the methods.

According to an example, hierarchal stripe locks may be obtained for a source stripe and a destination stripe. One of the hierarchal stripe locks may be determined as a primary stripe lock and the other hierarchal stripe lock may be determined as a secondary stripe lock. The primary stripe lock, for instance, may be obtained prior to the secondary stripe lock to avoid a deadlock. Either valid data or a data-migrated token may then be received from the source stripe. In response to receiving valid data, data from the source stripe may be written to the destination stripe, a data-migrated token may be written to the source stripe, a parity may be updated for the source stripe and the destination stripe, and the hierarchal stripe locks may be released for the source stripe and the destination stripe. In response to receiving the data-migrated token, the hierarchal stripe locks may be released for the source stripe and the destination stripe. A data-migrated token may be communicated and stored in lieu of data in a source buffer data cache line.

According to an example, one of the hierarchal stripe locks may be determined as a primary stripe lock and the other hierarchal stripe lock may be determined as a secondary stripe lock. The ordering of one of the hierarchal stripe locks is based on stripe numbers and identification numbers of media controllers for the source stripe and the destination stripe in according to one example. In this regard, a lower identification number may be sequenced as the primary stripe lock and the higher identification number may be sequenced as the secondary stripe lock. Alternatively, a higher identification number may be sequenced as the primary stripe lock and the lower identification number may be sequenced as the secondary stripe lock.

An entry into the live migration of the data may include two stages. A first stage may include arming reads for each distributed redundancy controller. The armed reads for each distributed redundancy controller are to redirect each read to the destination stripe when the data-migrated token is received. A second stage may include arming writes for each of the distributed redundancy controllers after completion of the first stage.

An armed write for each of the distributed redundancy controllers is to obtain the hierarchal stripe locks for the source stripe and the destination stripe, write the data to the destination stripe, write the data-migrated token to the source stripe, update a parity for the source stripe and the destination stripe, and release the hierarchal stripe locks for the source stripe and the destination stripe. According to an example, the live migration may only occur after all the media controllers are armed for reads in the first stage and armed for writes in the second stage. An exit from the live migration of the data may include a disarming stage. The disarming stage may include determining that the data-migrated token is received for all source stripes in a source memory buffer and updating each of the distributed redundancy controllers to only access the destination stripes in a destination memory buffer.

The benefits of volatile memory (e.g., fast, low-latency) and non-volatile memory (e.g., persistent) are being combined in emerging memory technologies. Consequently, memory may require increased fault tolerance to protect persistent user data and file systems. In-memory and memory mapped storage paradigms may require a fault tolerance scheme such as redundant array of independent disks (RAID) to provide a robust fault-tolerant solution. The implementation of RAID in load/store computer architectures requires that, in addition to memory and cache coherency, parity-data consistency must be maintained to prevent data-corruption and provide fault tolerance. Furthermore, processors require relatively low latency load/store access to coherent memory. As such, memory migration must occur concurrently with load/store accesses from processors while maintaining parity-data consistency. Memory migration may be used to move data from a failing memory module to a stable memory module, move data off of a lightly used memory module to repurpose the memory module, defragment in-memory file systems to reclaim free space, alter RAID memory groups, and etc.

Generally speaking, the disclosed examples provide a live memory migration of that maintains parity-data consistency and is invisible to an operating system. The disclosed examples coordinate the entry into and exit from a migration mode to avoid race conditions and deadlock from distributed redundancy controllers. The disclosed examples may move RAIDED memory from one memory module to another module, move RAIDED contents from a failing memory module to another memory module, move memory contents from one region of RAIDED memory to another region, consolidate two RAID memory groups, and reconfigure a RAID memory group. Additionally, the disclosed examples may provide migration overlap between a source region and a destination region. That is, for instance, the source region and the destination region may be almost identical, except that one storage module within the RAID set is being migrated.

With reference to FIG. 1, there is shown a block diagram of a computing device 100 that may implemented as a platform for the live migration of data from a source stripe to a destination stripe according to an example of the present disclosure. It should be understood that the computing device 100 may include additional components and that one or more of the components described herein may be removed and/or modified without departing from a scope of the computing device 100.

For example, the computing device 100 may include a processor 102, memory modules 104A-N (where N is an integer greater than 1), an input/output interface 106, private memory 108, and a redundancy controller 110 (e.g., a RAID controller). In one example, the computing device 100 is a server but other types of computing devices may be used. The computing device 100 may be a node of a distributed data storage system. For example, the computing device 100 may be part of a cluster of nodes that services queries and provide data storage for multiple users or systems, and the nodes may communicate with each other to service queries and store data. The cluster of nodes may provide data redundancy to minimize down time and prevent data loss in case of a node failure. Also, the components of the computing device 100 are shown in a single computer as an example, however, in other examples the components may exist on multiple computing devices and the components may comprise multiple processors, redundancy controllers, memory modules, interfaces, etc.

The processor 102 may be a microprocessor, a microcontroller, an application specific integrated circuit (ASIC), field programmable gate array (FPGA), or other type of circuit to perform various processing functions. The memory modules 104A-N may each include media controllers 120A-N and memory 121A-N. According to an example, each memory module may include its own media controller and memory. The media controller, for instance, may communicate with the memory and control access to the memory by the processor 102. The private memory 108 and memory 121A-N may include volatile dynamic random access memory (DRAM) with battery backup, non-volatile phase change random access memory (PCRAM), spin transfer torque-magnetoresistive random access memory (STT-MRAM), resistive random access memory (reRAM), memristor, FLASH, or other types of memory devices. For example, the memory may be solid state, persistent, dense, fast memory. Fast memory can be memory having an access time similar to DRAM memory.

The input/output (I/O) interface 106 may include a hardware and/or a software interface. The I/O interface 106 may be a network interface connected to a network, such as the Internet, a local area network, etc. The computing system 100 may receive data and user-input through the I/O interface 106. The computing system 100 may be connected to the memory modules 104A-N, which may be provided on the computing device 100 or on a separate computing device.

The components of computing device 100 may be coupled by a bus 105, where the bus 105 may be a communication system that transfers data between the various components of the computing device 100. In examples, the bus 105 may be a Peripheral Component Interconnect (PCI), Industry Standard Architecture (ISA), PCI-Express, HyperTransport®, NuBus, a proprietary bus, and the like.

The redundancy controller 110 may maintain fault tolerance across the memory modules 104A-N according to an example. The redundancy controller 110 is depicted as including a migration engine 112, a stripe locking module 114, and a read/write module 116. Blocks 112, 114, and 116 are shown to illustrate the functionality of the redundancy controller 110. However, the functionality is implemented by hardware. The migration engine 112 for example is hardware of the redundancy controller 110 and the modules 114 and 116 for example are hardware of the redundancy controller 110, and the engine 112 and the modules 114 and 116 may not be machine readable instructions executed by a general purpose computer. The migration engine 112, for example, may initiate a migration mode and iterate through an entire region of memory whose contents are to be migrated from a source memory region to a destination memory region during the migration mode. The stripe locking module 114, for example, may acquire and release a lock for a given memory region and hierarchal locks for a plurality of memory regions. The read/write module 116, for example, may process read or write operations to the memory.

Figure 2A:
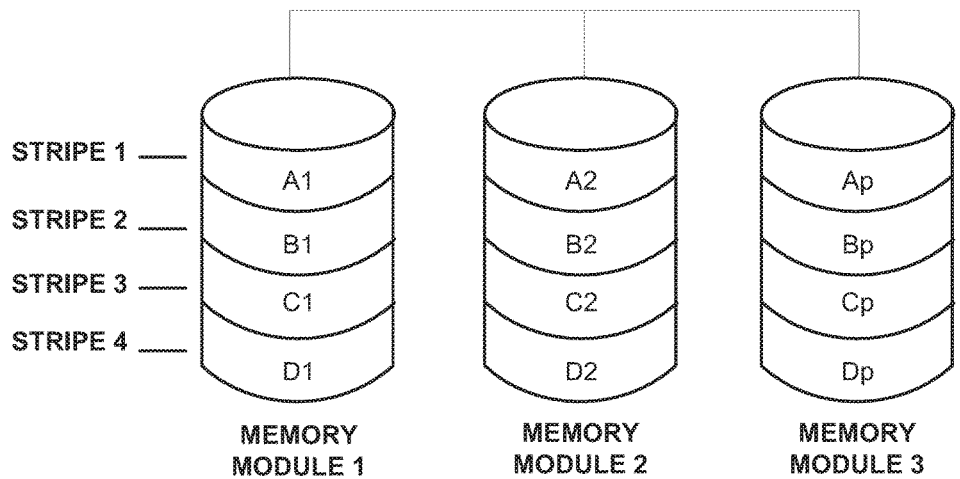
FIG. 2A shows striping across multiple memory modules in a fault tolerant scheme, according to an example of the present disclosure.

FIG. 2A depicts striping across multiple memory modules in a fault tolerant scheme, according to an example of the present disclosure. In FIG. 2A, the fault tolerant scheme utilizes a RAID-4 configuration that uses block-level striping with a dedicated parity memory module to provide redundancy to the multiple memory modules. Examples of the present disclosure, however, are not limited to the RAID-4 configuration, and may include various other fault tolerance schemes such as RAID-1, RAID-5, and RAID-6, etc. The example in FIG. 2A is used herein to define the terminology used throughout this disclosure.

Referring to FIG. 2A, the fault tolerant scheme may use memory associated with multiple memory modules (memory module 1, memory module 2, and memory module 3) to store memory blocks A1-Dp. According to an example, each memory block may include a single cache line. A cache line is the smallest unit of data that can be atomically read or written to a memory module. A cache line could be of any size used by processors, such as 64 bytes. Memory blocks A1, A2, B1, B2, C1, C2, D1, and D2 represent data blocks that are distributed across memory module 1 and memory module 2 to increase data throughput. Memory blocks Ap, Bp, Cp, and Dp represent parity blocks that are stored in memory module 3. The parity blocks provide redundancy for the data blocks. A stripe may include a combination of data blocks from at least one data memory module and at least one parity memory module. In other words, a stripe may include memory blocks distributed across multiple modules which contain redundant information, and must be atomically accessed to maintain the consistency of the redundant information. The memory blocks in a stripe may or may not be sequential in the address space of the processor. For example, one stripe may include memory blocks A1, A2, and Ap (stripe 1), another stripe may include memory blocks B1, B2, and Bp (stripe 2), another stripe may include memory blocks C1, C2, and Cp (stripe 3), and another stripe may include memory blocks D1, D2, and Dp (stripe 4). A RAID memory group may include stripes 1-4.

According to this example, if memory module 1 fails, the data blocks from memory module 2 may be combined with the parity blocks from memory module 3 (using the Boolean XOR function) to reconstruct the missing data blocks. For instance, if memory module 1 fails, then stripe 1 may be reconstructed by performing an XOR function on data block A2 and parity block Ap to determine data block A1. In addition, the other stripes may be reconstructed in a similar manner using the fault tolerant scheme of this example. In general, a data block on a single failed memory module may be reconstructed by XORing the corresponding blocks on all of the surviving memory modules.

Figure 2B:
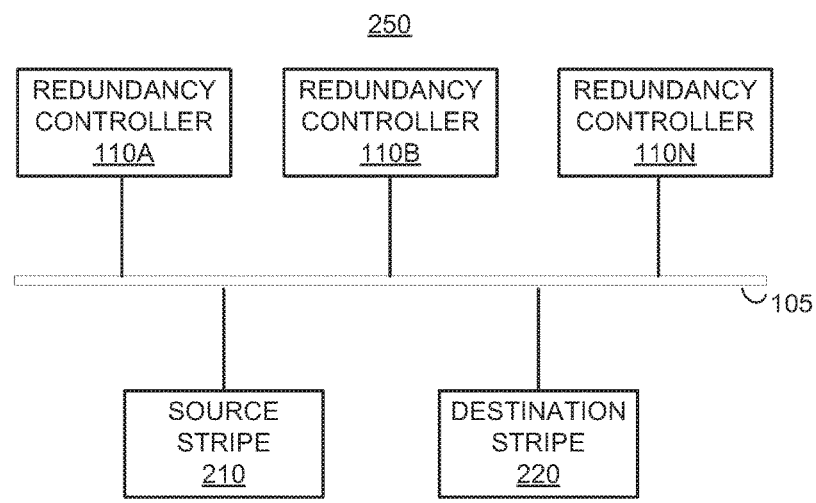
FIG. 2B shows a storage subsystem for a live migration of data from a source stripe to a destination stripe according to an example of the present disclosure.

With reference to FIG. 2B, there is shown storage subsystem 250 for the live migration of data from a source stripe to a destination stripe according to an example of the present disclosure. The storage subsystem 250 may include multiple redundancy controllers 110A-N that each attempt to access a source stripe 210 and a destination stripe 220 during the live migration of data. Generally speaking, the multiple redundancy controllers 110A-N need to be configured to safely co-exist without creating data/parity consistency hazards or deadlocks. The methods disclosed below in FIGS. 3-8 describe examples of a live migration method for the multiple redundancy controllers 110A-N to ensure correctness and the intermediate states necessary to ensure a safe transition into and from the live migration of the data.

FIGS. 3-7 respectively depict diagrams of a live migration method 300, a staging method 400, an armed pre-migration read method 500, an armed post-migration read method 600, and an armed migration write method 700 for live migration of data between a source stripe and a destination stripe according to examples of the present disclosure. It should be apparent to those of ordinary skill in the art that the methods 300-700 represent generalized illustrations and that other operations may be added or existing operations may be removed, modified or rearranged without departing from the scopes of the methods 300-700.

Figure 3:
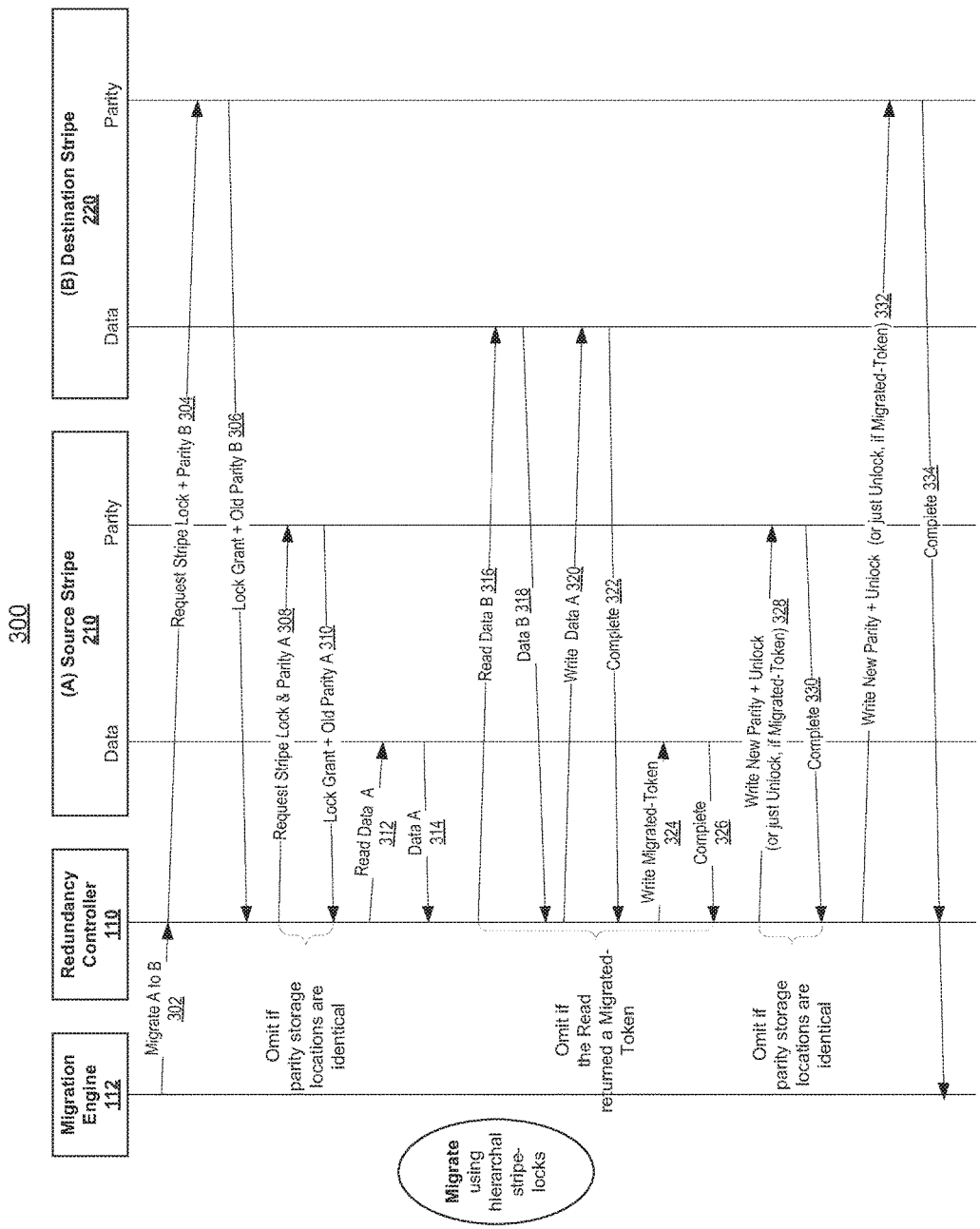
FIG. 3 shows a bounce diagram of a live migration method using hierarchal stripe-locks, according to an example of the present disclosure.

According to an example, the methods discussed below may include a processor 102, a redundancy controller 110, a migration engine 112, a source stripe 210, and a destination stripe 220. The source stripe 210 and the destination stripe 220 may each include a data cache line and a parity cache line, as shown in FIG. 3. Moreover, each data cache line and parity cache line may be associated with its own media controller. Moreover, the media controllers associated with the source stripe 210 may be a disjoint set of media controllers from those associated with the destination stripe 220. Alternatively, the media controllers associated with the source stripe 210 and destination stripe 220 may be a subset, a superset, an identical set, a reordered set, etc. of one another.

With reference to FIG. 3, there is shown a bounce diagram of a live migration method 300 using hierarchal stripe-locks, according to an example of the present disclosure.

In FIG. 3, the migration engine 112 may initiate a live migration of data from the source stripe 210 to the destination stripe 220 by transmitting a migration request to the redundancy controller 110, as shown at arc 302. According to one example, the migration engine 112 may be built into the redundancy controller 110. Upon receiving the migration request from the migration engine 112, the redundancy controller 110 may request a stripe lock and parity from a media controller that hosts the parity in the destination stripe 220, as shown in arc 304.

Since there is no single point of serialization with multiple concurrent redundancy controllers, a point of serialization is created at the memory module that hosts the parity. As such, the media controller of the parity memory module is accessed by all the redundancy controllers that are talking to the same set of memory modules for serialization. According to an example, the stripe lock may be an active queue inside the media controller that hosts the parity. The active queue may include a flag or bit that indicates whether a particular stripe is locked. That is, the media controller of the parity memory module may (i) keep track of all pending lock requests for a stripe, grant the lock requests one at a time so that each requestor gets a turn in sequence to hold the lock for that stripe and (ii) perform this independently for unrelated stripes. In this regard, any subsequent accesses by other redundant controllers to the locked stripe are in conflict and may be added to a conflict queue for later access when the stripe lock is released.

As shown in arc 306, the media controller that hosts the parity in the destination stripe 220 may grant the stripe lock for the destination stripe 220 and return an old parity to the requesting redundancy controller 110. The lock is granted, for instance, if the destination stripe 220 is not locked. The redundancy controller 110 may now request a stripe lock and parity from a media controller that hosts the parity in the source stripe 210, as shown in arc 308. As shown in arc 310, the media controller that hosts the parity in the source stripe 210 may grant the stripe lock for the source stripe 210 and return an old parity to the requesting redundancy controller 110. The lock is granted, for instance, if the source stripe 210 is not locked. According to an example, the sequences represented by arcs 308 and 310 are omitted if the parity storage location (i.e., the media controller identity and stripe number within the media controller) is identical for the source stripe 210 and the destination stripe 220.

According to an example, the stripe locking between the source stripe 210 and the destination stripe 220 is coordinated by a hierarchal stripe locking protocol in order to avoid a deadlock situation. An example of a deadlock situation may occur if two concurrent independent migration operations occur. One independent migration operation may have its source stripe parity at location A and destination stripe parity at location B. The other independent migration operation may have the reverse. If each independent migration operation were to attempt to obtain a source stripe lock before obtaining a destination stripe lock, a deadlock could result where each of the two independent migration operations obtains its source lock, and then is blocked from obtaining its destination lock by the other independent migration operation. On the other hand, if all migration operations observe a consistent order of locking, based, for instance, on stripe address and device number, then each of the independent migration operations may complete in turn, with no deadlock hazard.

According to an example, the conditions required to prevent such a deadlock are that (i) all redundancy controllers make mutually consistent choices with respect to the primacy of the locks, and that these choices are consistent between all types of hierarchically-locked operations, as further discussed in below in FIGS. 3 and 7. The stripe locking protocol, for instance, may order one of the stripe locks as a primary stripe lock and another stripe lock as a secondary stripe lock and may obtain the primary stripe lock prior to the secondary stripe lock. For example, the ordering of the hierarchal stripe locks may be based on stripe numbers and media controller identification numbers for the source stripe and the destination stripe. That is, the media controller having a lower identification number may be sequenced as the primary stripe lock and the media controller having the higher identification number may be sequenced as the secondary stripe lock. Alternatively, a higher identification number may be sequenced as the primary stripe lock and the media controller having the lower identification number may be sequenced as the secondary stripe lock If the media controller identification numbers are identical, then the stripe number (i.e., address) within the memory module may be used to similarly distinguish primary from secondary. If the stripe number is also identical, then the second lock operation must be omitted. In FIG. 3, for instance, the media controller that hosts the parity in the destination stripe 220 may have a lower identification number than the media controller that hosts the parity in the source stripe 210. Thus, according to the stripe locking protocol, the stripe lock for the destination stripe 220 is acquired prior to the stripe lock for the source stripe 210 in this example. According to another example, a lower addressed stripe may be sequenced before a higher addressed stripe, or vice versa.

As shown in arcs 312 and 314, the redundancy controller 110 may read and receive data from the source stripe 210. According to an example, the data received from the source stripe 210 may include one of a data-migrated token or valid data.

In response to receiving the valid data, the redundancy controller 110 may continue the process of copying data from the source stripe 210 to the destination stripe 220. In particular, the redundancy controller 110 may read and receive data from the destination stripe 220, as shown in arcs 316 and 318. The data may be read from the destination stripe 220 in order to calculate the new data to write to the parity of the destination stripe 220. As shown in arcs 320 and 322, the redundancy controller 110 may then write data from the source stripe 210 to the data cache line of the destination stripe 220 and receive a complete message in return. As shown in arcs 324 and 326, the redundancy controller 110 may then write a data-migrated token to the data cache line of the source stripe 210 and receive a complete message in return. The redundancy controller 110 may write a new parity to the parity cache line of the source stripe 210, release the stripe lock from the parity cache line of the source stripe 210, and receive a complete message in return, as shown in arcs 328 and 330. The new source parity value written in arc 328 is calculated from the old parity value returned in arc 310, modified to reflect the change in data value from the value received in arc 312 to the data-migrated token value written in arc 324. According to an example, the sequences represented by arcs 328 and 330 are omitted if the parity storage location is identical for the source stripe 210 and the destination stripe 220. In addition, the redundancy controller may write a new parity to the parity cache line of the destination stripe 220, release the stripe lock from the parity cache line of the destination stripe 220, and receive a complete message in return, as shown in arcs 332 and 334. The new destination parity value written in arc 332 is calculated from the old parity value returned in arc 306, modified to reflect the change in data value from the value received in arc 318 to the new migrated value written in arc 320.

In response to receiving a data-migrated token, the redundancy controller 110 may determine that the data from the source stripe 210 has already been migrated to the data cache line of the destination stripe 220. Accordingly, the redundancy controller 110 may then simply release the stripe lock from the source stripe 210 and receive a complete message in return, as shown in arcs 328 and 330. According to an example, the sequences represented by arcs 328 and 330 are omitted if the parity storage location in the source stripe 210 and the parity storage location in the destination stripe 220 are the same. As shown in arcs 332 and 334, the redundancy controller 110 may then release the stripe lock from the destination stripe 220 and receive a complete message in return.

According to an example, the source stripe 210 and the destination stripe 220 may be identical with the exception that one of the memory modules is being replaced by a new memory module. In this instance, only the data and parity stored in the memory module being replaced is migrated. However, the parity calculation still involves all of the memory modules. According to another example, the migration engine 112 may then iterate through an entire region of memory whose contents are to be migrated from a source memory region to a destination memory region in accordance with the live migration method 300. Once the live migration is complete, all write and read operations will target the destination memory location.

Figure 4:
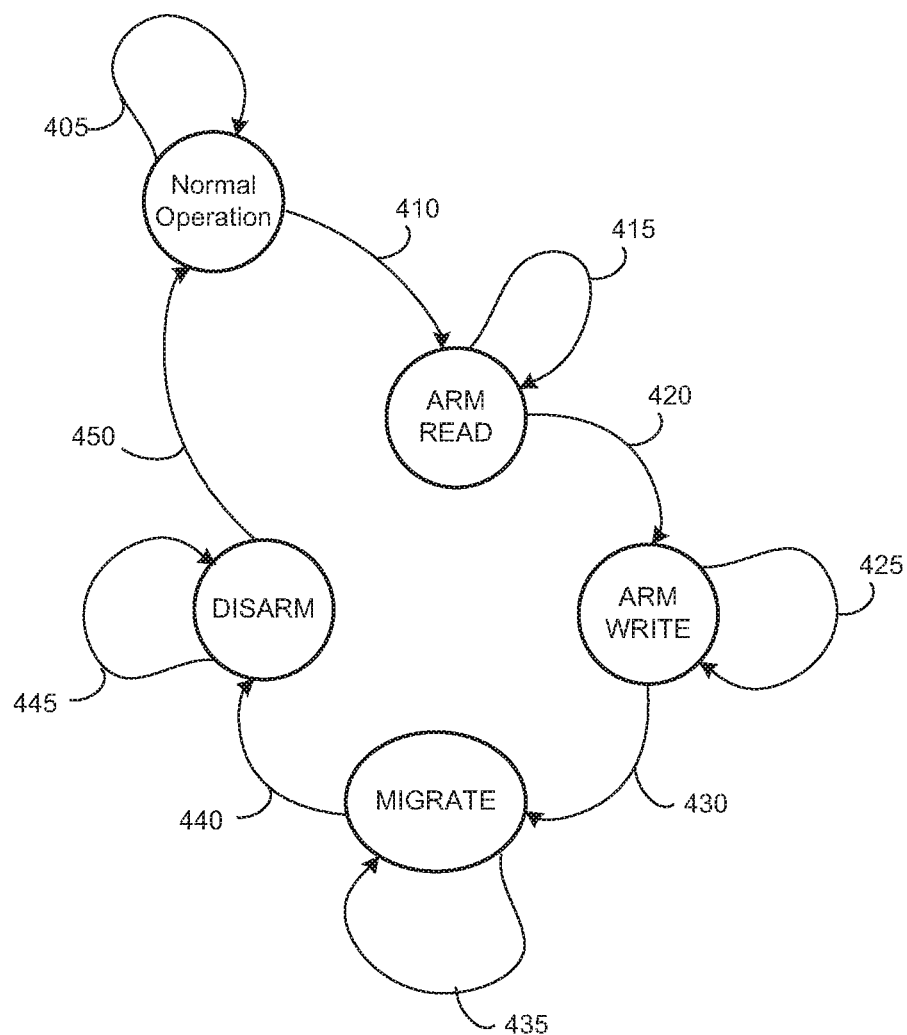
FIG. 4 shows a state diagram of a method for staging an entry into and an exit from a live migration of data, according to an example of the present disclosure.

Referring to FIG. 4, there is shown a state diagram of a method 400 for staging an entry into and an exit from the live migration of data. FIG. 4 describes an overall state sequence used to prepare for migration (i.e., arm read, arm write states), perform the migration (migrate state), and finally to resume a normal state (disarm state). According to an example, the staging includes the implementation of these states shown in FIG. 4 to ensure that the multiple redundancy controllers 110A-N in the storage subsystem 250 may safely co-exist without creating data/parity consistency hazards or deadlocks, as discussed above.

A normal state where no migration is taking place is shown in state 405. According to an example, a transition into the live migration mode may begin by starting to arm reads for each of the multiple redundancy controllers 110A-N in the storage sub-system 250. Arming the reads, for instance, may provide that each of the multiple redundancy controllers 110A-N redirect all reads to the destination stripe 220 if a data-migrated token is received when reading the source stripe 210. State 415 depicts a stage where the redundancy controllers 110A-N are being armed for reads.

Armed writes are unsafe to comingle with unarmed reads targeting the source stripe until all redundancy controllers 110A-N are in an armed read state. Thus, there can never be an armed write concurrent with an unarmed read, according to an example of the present disclosure. After all of the redundancy controllers 110A-N have been armed for reads, as shown in state 420, the redundancy controllers 110A-N may then begin to the armed for writes, as shown in state 425. Arming the writes, for instance, may provide that, for each write performed by a redundancy controller, the redundancy controller first obtains hierarchal stripe locks for the source stripe 210 and the destination stripe 220, writes data to the destination stripe 220, writes a data-migrated token to the source stripe 210, and then releases the hierarchical stripe locks for the source stripe 210 and the destination stripe 220.

According to an example, unarmed writes may safely comingle with armed writes. That is, any armed write has the side effect of performing a cache line migration and any unarmed write has the opposite side-effect, and they undo any earlier migration for that cache line. Thus, the effectiveness of migration may only be guaranteed once it is known that there are no further unarmed writes occurring. The armed write state ensures that all subsequent migrations in the migrate state may be effective because state transition 430 does not occur until all redundancy controllers 110A-N are in the armed write state.

After all the redundancy controllers 110A-N are armed for writes, as shown in state 430, the redundancy controllers 110A-N are prepared to safely migrate data as directed by the migration engine 112. As shown in state 435, the multiple redundancy controllers 110A-N are directed by the migration engine 112 to iterate through the aperture of memory that is to be migrated. The method for the live migration 300 in FIG. 3 may be implemented in state 435. Once the migration engine 112 has migrated all cache lines while in the migrate state, there remains no unmigrated cache lines in the source stripe 210 (i.e., every read of the source stripe 210 returns a data-migrated token, and every read of the destination stripe 220 returns the data). Only once this state is reached, may it be safe to begin redirecting all reads and writes to directly access the destination stripe 220 without the armed read or armed write behaviors.

Accordingly, state transition 440 allows disarming of the redundancy controllers only after migration is known to be complete. Since the disarmed redundancy controllers send all writes directly to the destination stripe 220, unarmed writes no longer result in the undoing of cache line migrations, as they did in the armed write state. As shown in state 440, the redundancy controllers 110A-N may be disarmed as shown in state 445. Because of the source memory has already been migrated in state 445, the data-migrated token is valid for the entire source memory aperture that has been migrated. As such, the destination memory contains all of the migrated source memory contents. Accordingly, disarming redundancy controllers 110A-N may include updating the redundancy controllers 110A-N to only use the destination memory for future reads and writes. Once all the redundancy controllers 110A-N are disarmed, as shown in state 450, the redundancy controllers 110A-N are ready for normal state again as shown in state 405.

Figure 5:
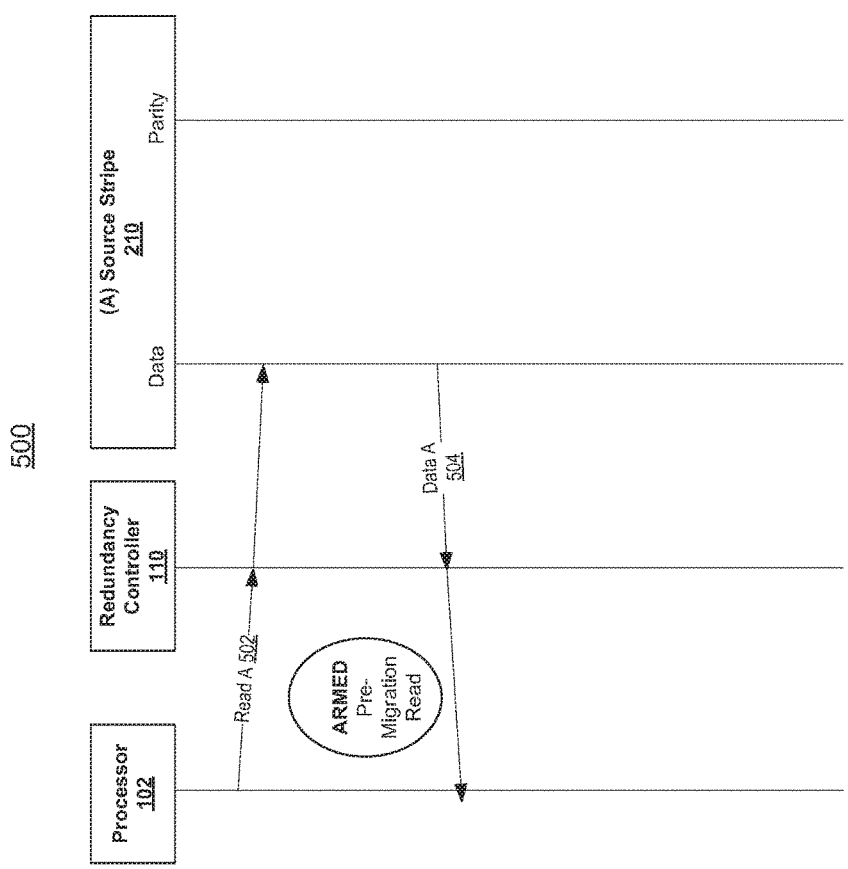
FIG. 5 shows a bounce diagram of an armed pre-migration read method, according to another example of the present disclosure.

With reference to FIG. 5, there is shown a bounce diagram of an armed pre-migration read method 500, according to an example of the present disclosure. The processor 102, for instance, may initiate a read of data from the source stripe 210 via the redundancy controller 110, as shown in arc 502. Since this read takes place prior to the migration of data from the source stripe 210 to the destination stripe 220, the source stripe 210 returns the requested data to indicate that the requested data is still located in the data cache line of the source stripe 210 as shown in arc 504.

Figure 6:
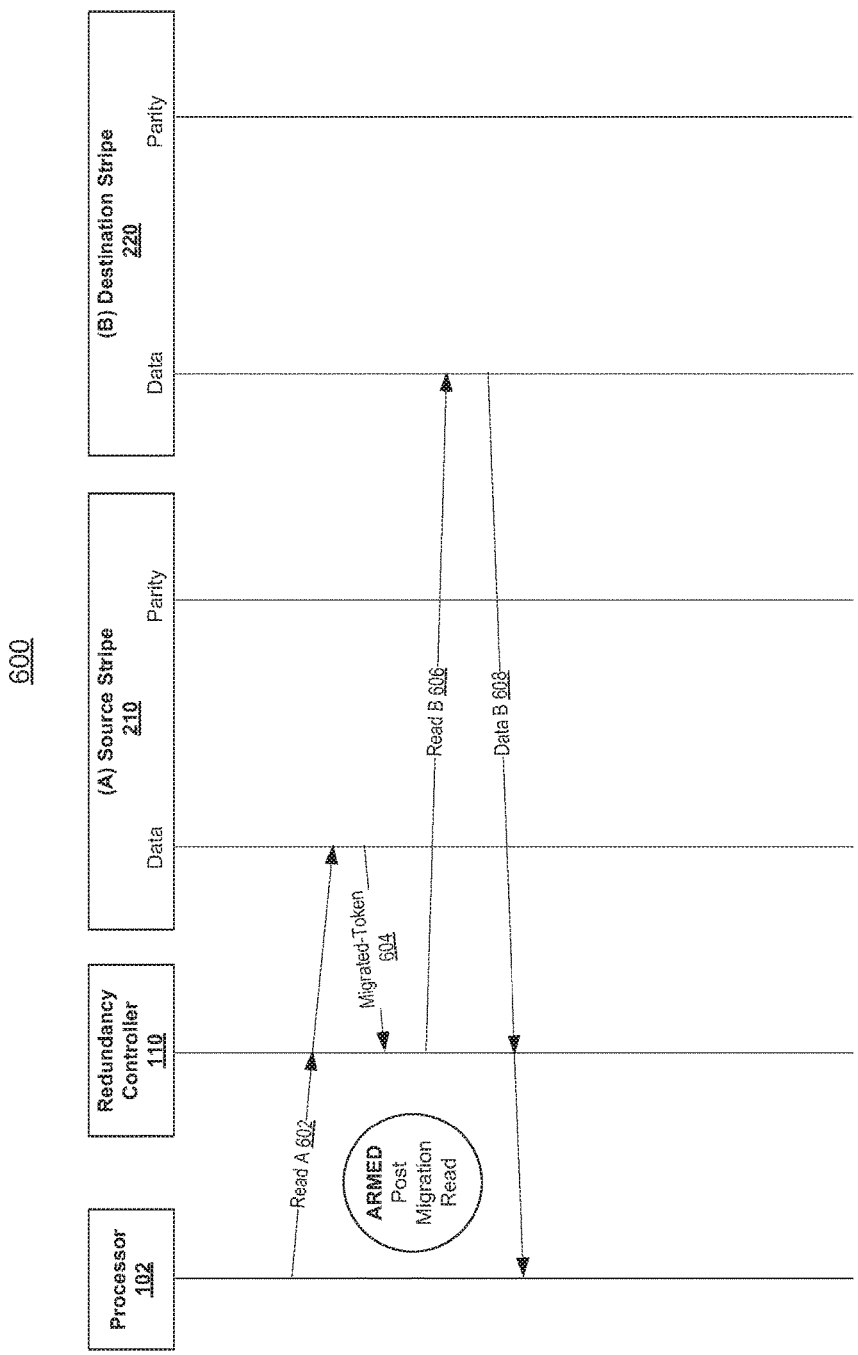
FIG. 6 shows a bounce diagram of an armed post-migration read method, according to an example of the present disclosure.

With reference to FIG. 6, there is shown a bounce diagram of an armed post-migration read method 600, according to an example of the present disclosure. The processor 102, for instance, may initiate a read of data from the source stripe 210 via the redundancy controller 110, as shown in arc 602. Since this read takes place after to the migration of data from the source stripe 210 to the destination stripe 220, the source stripe 210 may return a data-migrated token to indicate that the requested data is no longer located in the data cache line of the source stripe 210 as shown in arc 604. Accordingly, as shown in arc 606, the redundancy controller 110 may initiate a read of the migrated data from the data cache line of the destination stripe 220. In response read request by the redundancy controller 110, media controller of the destination stripe 220 may return the requested data from its data cache line, as shown in arc 608.

Figure 7:
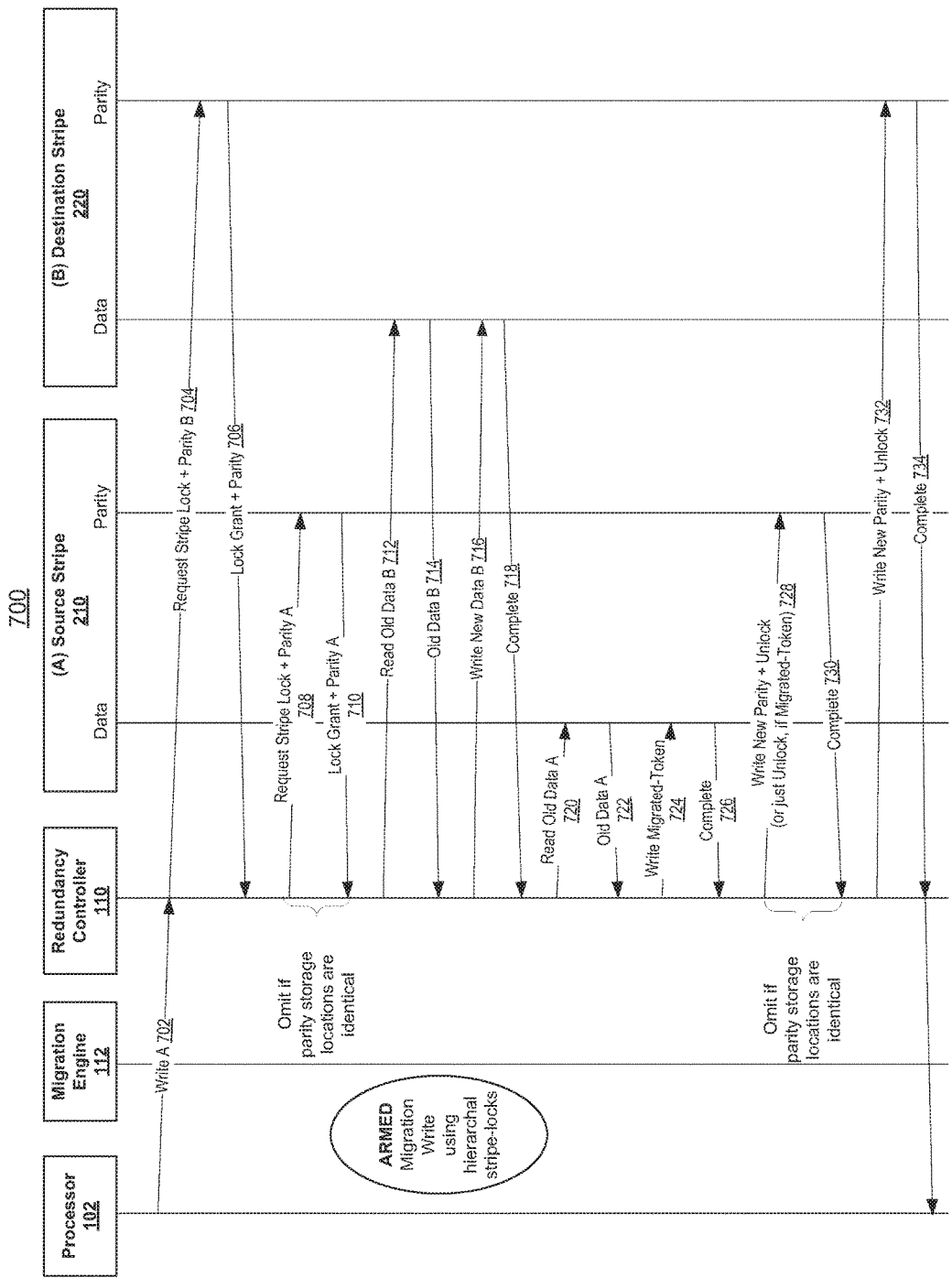
FIG. 7 shows a bounce diagram of an armed write method, according to an example of the present disclosure.

With reference to FIG. 7, there is shown a bounce diagram of an armed write method 700, according to an example of the present disclosure. The armed write method 700 may be implemented prior, during, or subsequent to the live migration according to an example.

In FIG. 7, the processor 102 may initiate a write request to the redundancy controller 110, as shown in arc 702. The write request, for instance, may be to write new data to the source stripe 210. Upon receiving the write request from the processor 102, the redundancy controller 110 may request a stripe lock and parity from a media controller that hosts the parity in the destination stripe 220, as shown in arc 704. As shown in arc 706, the media controller that hosts the parity in the destination stripe 220 may grant the stripe lock for the destination stripe 220 and return an old parity to the requesting redundancy controller 110. The stripe lock is granted, for instance, if the destination stripe 220 is not locked.

The redundancy controller 110 may now request a stripe lock and parity from the media controller that hosts the parity in the source stripe 210, as shown in arc 708. As shown in arc 710, the media controller that hosts the parity in the source stripe 210 may grant the stripe lock for the source stripe 210 and return an old parity to the requesting redundancy controller 110. The lock is granted, for instance, if the source stripe 210 is not locked. According to an example, the sequences represented by arcs 308 and 310 are omitted if the parity storage location is identical for the source stripe 210 and the destination stripe 220.

According to an example, the stripe locking between the source stripe 210 and the destination stripe 220 is coordinated by the hierarchal stripe locking protocol discussed above in order to avoid a deadlock situation. For example, according to the stripe locking protocol, the stripe lock for the destination stripe 220 is acquired prior to the stripe lock for the source stripe 210 in this example.

As shown in arcs 712 and 714, the redundancy controller 110 may read and receive old data from the data cache line of the destination stripe 220. The redundancy controller 110 may then write the new data to the data cache line of the destination stripe 220 and receive a complete message in return, as shown in arcs 716 and 718.

The redundancy controller 110 may read and receive old data from the data cache line of the source stripe 210, as shown in arcs 712 and 714. According to an example, the redundancy controller 110 may then write a data-migrated token to the data cache line of the source stripe 210 and receive a complete message in return as shown in arcs 724 and 726.

The redundancy controller 110 may write a new parity to the parity cache line of the source stripe 210, unlock the source stripe 210, and receive a complete message in return, as shown in arcs 728 and 730. The new source parity value written in arc 728 is calculated from the old parity value returned in arc 710, modified to reflect the change in data value from the value received in arc 722 to the data-migrated token value written in arc 724. Alternatively, the redundancy controller 110 may just unlock the source stripe 210 if a data-migrated token is returned during the read of the source stripe 210. According to an example, the sequences represented by arcs 728 and 730 are omitted if the parity storage location is identical for the source stripe 210 and the destination stripe 220. In addition, the redundancy controller may write a new parity to the parity cache line of the destination stripe 220, release the stripe lock from the parity cache line of the destination stripe 220, and receive a complete message in return, as shown in arcs 732 and 734. The new destination parity value written in arc 732 is calculated from the old parity value returned in arc 706, modified to reflect the change in data value from the value read in arc 714 to the new write-data value written in arc 716.

Figure 8:
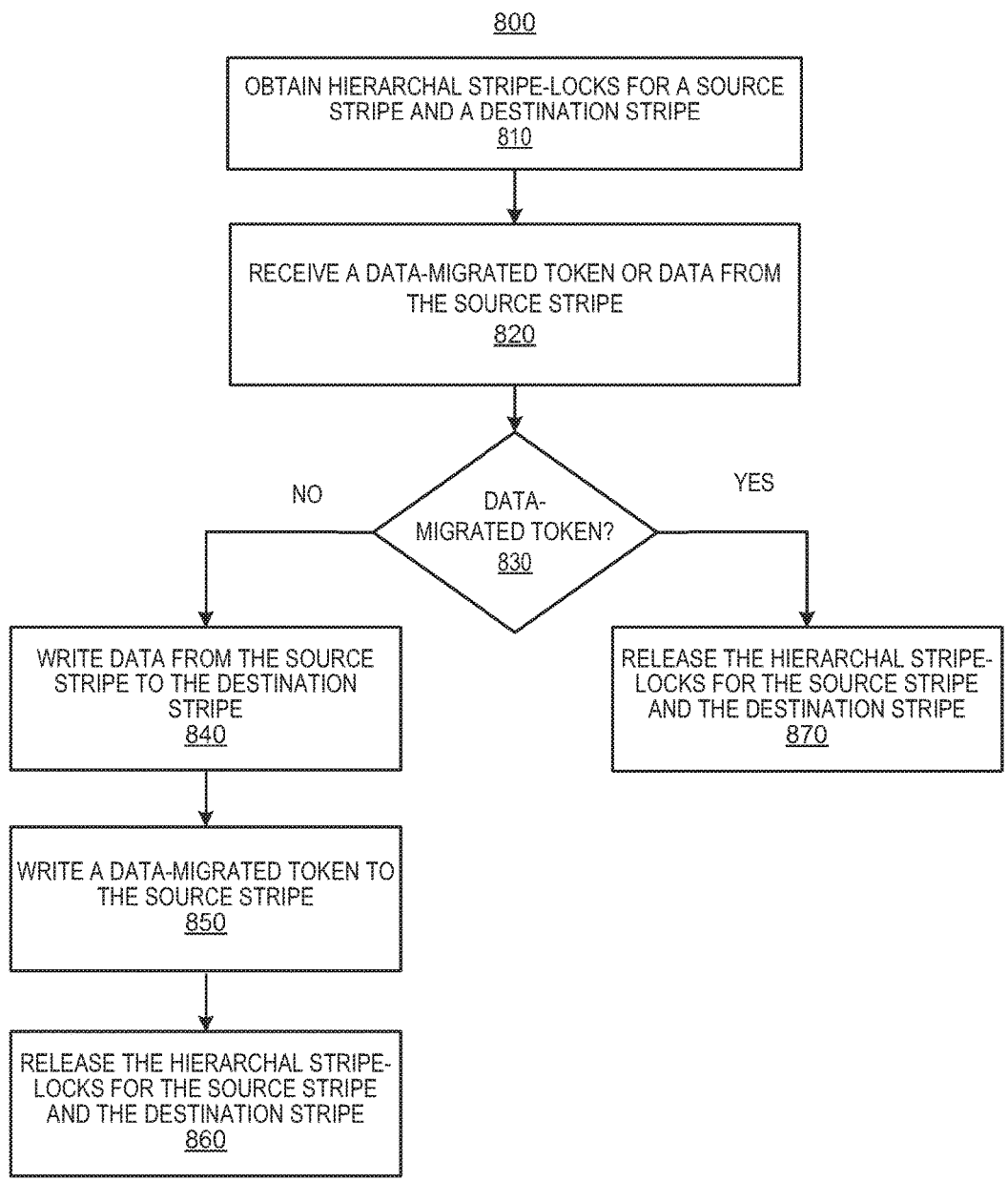
FIG. 8 shows a flow diagram of a live migration method using hierarchal stripe-locks, according to an example of the present disclosure.

With reference to FIG. 8, there is shown a flow diagram of a live migration method 800 using hierarchal stripe-locks, according to an example of the present disclosure. The method 800 may be implemented using the processor 102 of computing device 100 according to an example.

In block 810, stripe locking module, for instance, may obtain hierarchal stripe locks for a source stripe and a destination stripe. According to an example, one of the hierarchal stripe locks may be determined as a primary stripe lock and the other hierarchal stripe lock may be determined as a secondary stripe lock. The primary stripe lock, for instance, may be obtained prior to the secondary stripe lock. The ordering of one of the hierarchal stripe locks is based on stripe numbers and identification numbers of media controllers for the source stripe and the destination stripe in according to one example. If the media controller identification numbers are identical, then the stripe number (i.e., address) within the memory module may be used to similarly distinguish primary from secondary. If the stripe number is also identical, then the second lock operation must be omitted.

In block 820, the read/write module 116, for instance, may receive a data-migrated token from the source stripe or valid data for the source stripe. A data-migrated token indicates that the data has already been migrated. If data is returned, then migration can proceed as shown in block 830.

In response to receiving read data for the source stripe, the read/write module 116, for instance, may write data from the source stripe to the destination stripe (840), write a data-migrated token to the source stripe (850), update a parity for the source stripe and the destination stripe, and release the hierarchal stripe locks for the source stripe and the destination stripe (860).

In response to receiving the data-migrated token, the read/write module 116, for instance, may release the hierarchal stripe locks for the source stripe and the destination stripe (870).

According to an example, an entry into the live migration of the data includes two stages. The first stage may include arming reads for each distributed redundancy controller. The armed reads for each distributed redundancy controller are to redirect each read to the destination stripe when the data-migrated token is received. A second stage may include arming writes for each of the distributed redundancy controllers. The armed writes for each of the distributed redundancy controllers are to obtain the hierarchal stripe locks for the source stripe and the destination stripe, write the to the destination stripe, write the data-migrated token to the source stripe, and release the hierarchal stripe locks for the source stripe and the destination stripe.

According to another example, an exit from the live migration of the data includes a disarming stage. The disarming stage may include determining that the data-migrated token is received for all source stripes in a source memory buffer and updating each of the distributed redundancy controllers to only access the destination stripes in a destination memory buffer.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A method for live migration of data from a source stripe to a destination stripe, the method comprising:
  obtaining, by a redundancy controller, hierarchal stripe locks for the source stripe and the destination stripe;
  receiving a data-migrated token or the data from the source stripe;
  in response to receiving the data,
    writing the data from the source stripe to the destination stripe,
    writing a data-migrated token to the source stripe, and
    releasing the hierarchal stripe locks for the source stripe and the destination stripe; and
  in response to receiving a data-migrated token indicating the data is already migrated from the source stripe,
    releasing the hierarchal stripe locks for the source stripe and the destination stripe;
  wherein obtaining the hierarchal stripe locks comprises ordering one of the hierarchal stripe locks as a primary stripe lock and another of the hierarchal stripe locks as a secondary stripe lock, and obtaining the primary stripe lock prior to the secondary stripe lock.

2. The method of claim 1, comprising staging an entry into the live migration of the data, wherein a first stage comprises:
  arming reads for each distributed redundancy controller, wherein the armed reads for each distributed redundancy controller are to redirect each read to the destination stripe when the data-migrated token indicating the data is already migrated from the source stripe.

3. The method of claim 2, wherein the staging comprises a second stage and the second stage comprises:
  arming writes for each of the distributed redundancy controllers, wherein each write performed by a distributed redundancy controller is to:
    obtain the hierarchal stripe locks for the source stripe and the destination stripe,
    write the data to the destination stripe,
    write the data-migrated token to the source stripe, and
    release the hierarchal stripe locks for the source stripe and the destination stripe.

4. The method of claim 1, comprising staging an exit from the live migration of the data, wherein staging the exit comprises:
   determining that the data migrated token is received for all source stripes in a source memory buffer; and
   updating each of the distributed redundancy controllers to only access the destination stripes in a destination memory buffer.

5. The method of claim 1, wherein the ordering of one of the hierarchal stripe locks is based on stripe numbers and identification numbers of media controllers for the source stripe and the destination stripe.

6. A computing device for live migration of data from a source stripe to a destination stripe, comprising a hardware redundancy controller to:
   acquire hierarchal stripe locks for the source stripe and the destination stripe;
      receive one of the data and a data-migrated token from the source stripe;
   copy the data from the source stripe to the destination stripe and release the hierarchal stripe locks for the source stripe and the destination stripe if the data is received from the source stripe; and
   release the hierarchal stripe locks for the source stripe if the data-migrated token is received from the source strip;
   wherein the hardware redundancy controller is to arm each distributed redundancy controller to redirect reads to the destination stripe when the data-migrated token is received as a first stage prior to the live migration of data.

7. The computing device of claim 6, wherein to copy data from the source stripe to the destination stripe, the hardware redundancy controller is to write a data-migrated token to the source stripe.

8. The computing device of claim 6, wherein the hardware redundancy controller is to arm writes for each of the distributed redundancy controllers, wherein each write is to acquire the hierarchal stripe locks for the source stripe and the destination stripe, copy the data from the source stripe to the destination stripe, write the data-migrated token to the source stripe, and release the hierarchal stripe locks for the source stripe and the destination stripe as a second stage prior to the live migration of data.

9. The computing device of claim 6, wherein the hardware redundancy controller is to determine that the data-migrated token is received for all source stripes in a source memory buffer and update each of the distributed redundancy controllers to only access the destination stripes in a destination memory buffer subsequent to the live migration of data.

10. The computing device of claim 6, wherein to acquire the hierarchal stripe locks, the hardware redundancy controller is to:
   order one of the hierarchal stripe locks as a primary stripe lock and another of the hierarchal stripe locks as a secondary stripe lock; and
   acquire the primary stripe lock prior to the secondary stripe lock.

11. A system comprising:
   a plurality of redundancy controllers;
   a plurality of memory modules each including a media controller and a memory, wherein the memory modules are connected to the plurality of redundancy controllers through a memory bus,
   wherein each of the redundancy controllers is to:
   initiate, by a migration engine, the live migration of data from a source stripe to a destination stripe, wherein the source stripe and the destination stripe are in at least one of the plurality of memory modules;
   acquire, by a stripe locking module, hierarchal stripe locks for a source stripe and a destination stripe; and
   receive data-migrated token or the data for the source stripe, wherein in response to receiving the data for the source stripe, write the data from the source stripe to the destination stripe, write a data-migrated token to the source stripe, update a parity for the source stripe and the destination stripe, and release the hierarchal stripe locks for the source stripe and the destination stripe, and
   wherein in response to receiving the data-migrated token, release the hierarchal stripe locks for the source stripe and the destination stripe.

12. The system of claim 11, each of the redundancy controllers is to stage an entry into the live migration of the data, wherein to stage the entry is to:
   arm reads for each distributed redundancy controller, wherein the armed reads for each distributed redundancy controller are to redirect each read to the destination stripe when the data-migrated token is received; and
   arm writes for each of the distributed redundancy controllers, wherein each write by a distributed redundancy controller is to:
      obtain the hierarchal stripe locks for the source stripe and the destination stripe,
      write the data from the source stripe to the destination stripe,
      write the data-migrated token to the source stripe,
      update the parity for the source stripe and the destination stripe, and
      release the hierarchal stripe locks for the source stripe and the destination stripe.

13. The system of claim 11, wherein the each of the redundancy controllers is to stage an exit from the live migration of the data, wherein to stage the exit is to:
   determine that the data-migrated token is received for all source stripes in a source memory buffer; and
   update each of the distributed redundancy controllers to only access the destination stripes in a destination memory buffer.

* * * * *